United States Patent [19]
Kohler

[11] Patent Number: 5,020,043
[45] Date of Patent: May 28, 1991

[54] ELECTRONIC MEDIA STORAGE APPARATUS

[75] Inventor: Arthur Kohler, Mentor, Ohio

[73] Assignee: Chagrin Plastic Methods, Inc., Mentor, Ohio

[21] Appl. No.: 310,775

[22] Filed: Feb. 14, 1989

[51] Int. Cl.[5] .......................... G11B 7/08; A47B 21/06
[52] U.S. Cl. ........................................ 369/36; 369/34; 312/11
[58] Field of Search .................. 369/36, 37, 34, 38, 369/39; 108/20, 21; 312/10, 14, 11, 15, 40, 41, 12, 13, 234.1, 234.2, 234.5, 16

[56] References Cited

U.S. PATENT DOCUMENTS

| | | | |
|---|---|---|---|
| 3,692,376 | 9/1972 | McKinsey et al. | 312/11 |
| 3,765,738 | 10/1973 | Cobb | 312/11 |
| 3,777,895 | 12/1973 | Weinstein et al. | 312/11 X |
| 4,221,440 | 9/1980 | Morgan | 312/11 |
| 4,609,232 | 9/1986 | Florence | 312/16 |
| 4,814,592 | 3/1989 | Bradt et al. | 369/34 |
| 4,826,261 | 5/1989 | Nademlejnsky | 312/11 |
| 4,888,751 | 12/1989 | Yoshimara et al. | 369/36 |

*Primary Examiner*—Paul Ip
*Attorney, Agent, or Firm*—Michael H. Minns

[57] ABSTRACT

A carousel like unit for the storage of floppy disks and other electronic media such as cassette tapes, compact disks, and video tapes. The storage unit rotates about a vertical axis and uses an indexer to select desired storage compartments.

14 Claims, 5 Drawing Sheets

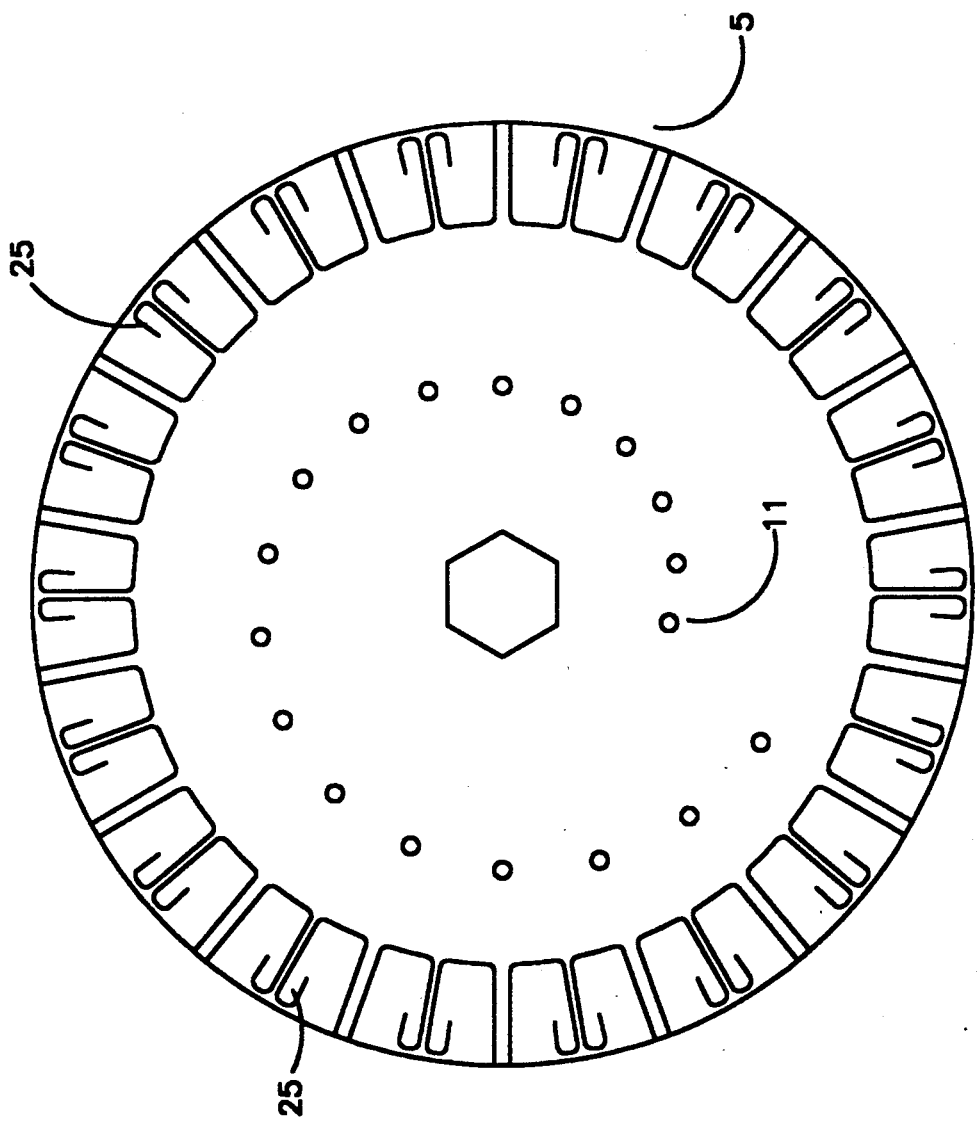

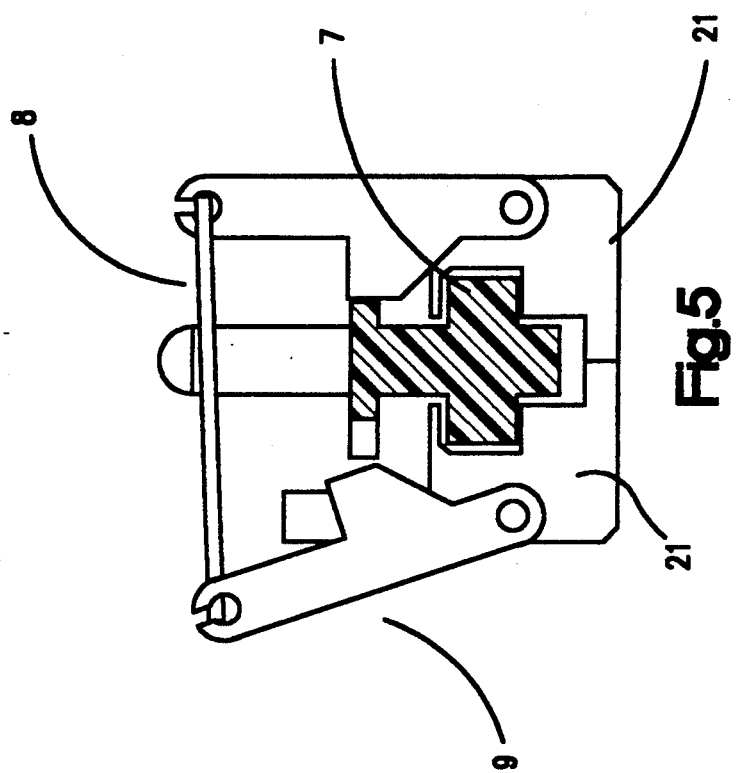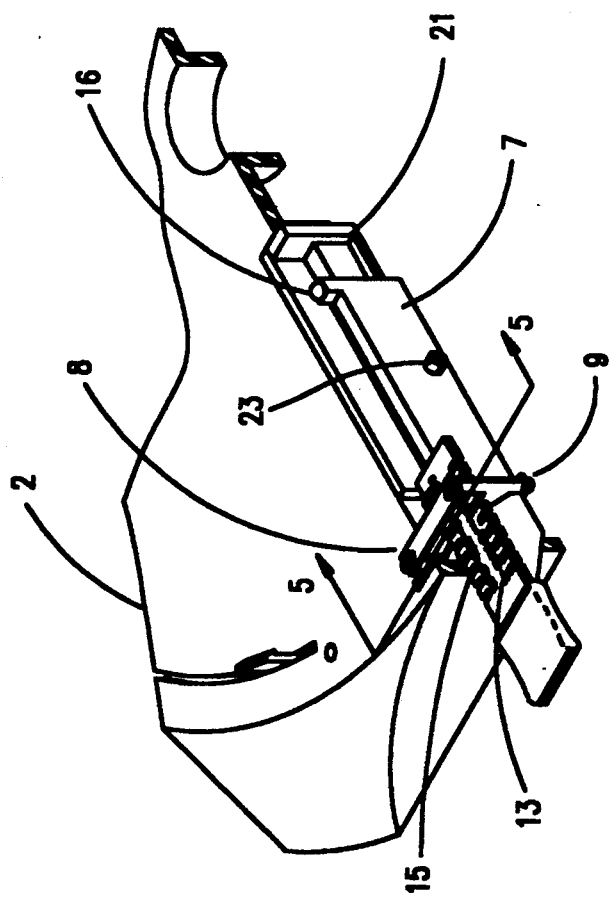

ELECTRONIC MEDIA STORAGE APPARATUS

FIELD OF INVENTION

This invention relates to storage of electronic media such as floppy disks, compact laser disks, cassette tapes, cartridge disks, and the like. More particularly, this invention uses an indexing mechanism which allows a disk or tape to be quickly located and removed.

BACKGROUND OF THE INVENTION

The use of small computers, generally known as personal computers, has proliferated. Personal computers typically use flexible magnetic disks, known as floppy disks, for storage of information. As personal computers spread, the uses for the computers expanded also.

Today, there are available word processing programs, data base management programs and spread sheet programs that sometimes require ten or more floppy disks just for the program. A large mailing list or inventory list can also fill in excess of ten floppy disks. With the many varied programs available, the business owner or home owner of a personal computer can easily be using a hundred or more floppy disks.

Most of the storage units available for floppy disks are essentially rectangular tubs with several moveable internal dividers. These storage units function much like a library card catalog except there is no retaining rod inserted through the floppy disk or disk sleeves to retain the disks in order. To locate a specific floppy disk, the disks are searched or leafed through until the desired disk is found. Since the disks are usually loosely set into the storage unit with several or more disks between the internal dividers, no gap or empty slot remains to show from where the desired disk was removed.

As a result, disks are frequently replaced at any convenient spot in the storage unit thus undoing any logical grouping or ordering of the floppy disks.

SUMMARY OF THE INVENTION

The present invention consists of a circular storage unit which rotates about a vertical axis having an indexing mechanism which stops rotation at the selected storage compartment. The storage unit has individual compartments for 36 3.5 inch floppy disks. There are 18 compartments spaced about the circular base with each compartment being divided into upper and lower halves.

To access a storage compartment, an index card is consulted and the desired compartment is selected. An index lever is manual moved to a position corresponding to the desired compartment. The storage unit is rotated by hand about a vertical axis until the unit stops and latches at the comparment selected by the index arm. The two storage locations (upper and lower) are then accessed by opening an access door.

BRIEF DESCRIPTION OF THE DRAWINGS

FIG. 3 is a bottom view of the lower guide plate showing the latching arm retention apertures.

FIG. 4 is a cutaway perspective view showing the detail of the latch assembly.

FIG. 5 is a perspective view taken along section line 5—5 of FIG. 4 showing detail of the latch assembly.

DETAILED DESCRIPTION OF THE INVENTION

Figure 6:
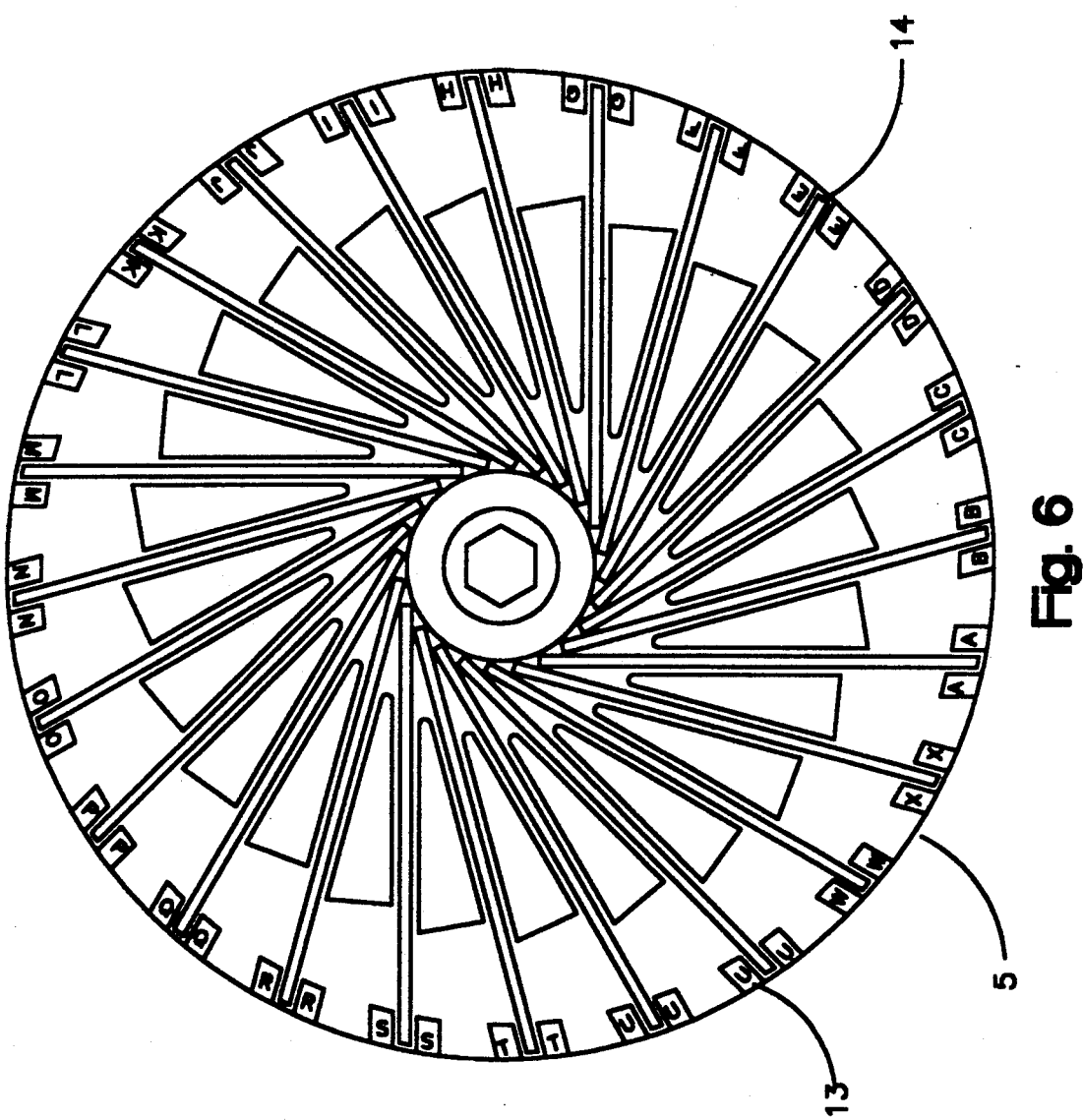
FIG. 6 is a top view of the lower guide plate showing an alternate configuration.

The preferred embodiment described first is an electronic media storage apparatus for use with 3.5 inch floppy disks. The storage apparatus for 3.5 inch disks has capacity for 36 disks. An alternate configuration for 5.25 inch floppy disks has capacity for 24 disks. The primary difference between the 3.5 inch floppy disk configuration and the 5.25 inch floppy disk configuration is the arrangement of the storage slots in the upper, middle and lower guide plates. The 3.5 inch disk storage apparatus also has two levels of storage compartments whereas the 5.25 inch disk storage apparatus has only one level. FIG. 6 shows the lower guide plate for the 5.25 inch floppy disks.

Figure 1:
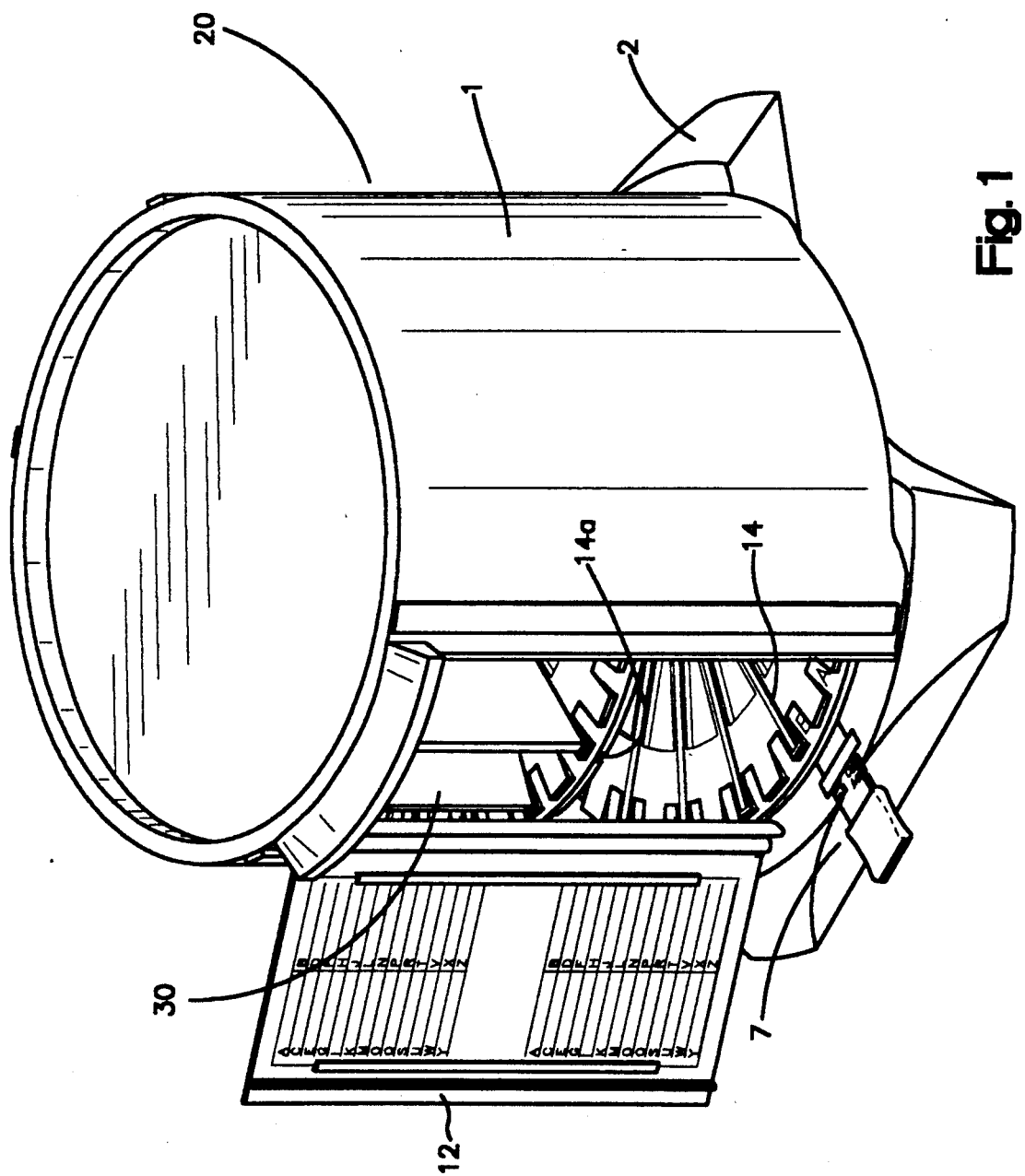
FIG. 1 is a perspective view of an electronic media storage apparatus.

The electronic media storage apparatus is a rotating carousel-like device which holds floppy disks 30. FIG. 1 is a perspective view of the electronic media storage apparatus showing the major components.

A floppy disk 30 is held vertical by being placed into slots 14, 14a which are located on a lower guide plate 5, a middle guide plate 24, and an upper guide plate 6. The middle guide plate 24 has slots 14, 14a in its upper and lower surfaces. The guide plates are aligned so that the slots 14 are aligned with the slots 14a in the opposing guide plate. The slot 14 in the lower guide plate 5 and slot 14 on the upper surface of the middle guide plate 24 are closed at the outer diameter of the guide plates. This closed end end helps to hold the floppy disk 30 in place and prevents the floppy disk from slipping beyond the outer edge of the guide plates 5, 24, 6. If a floppy disk were to slip out to this point, it could interfere with the rotation of the unit. The upper slot 14a is open at the outer end to facilitate removing or inserting the floppy disk.

The lower, middle and upper guide plates 5, 24, 6 are held apart by a vertical axle 3 and spacers 4. The electronic media storage apparatus can be rotated clockwise or counterclockwise about the vertical axle 3. The spacers 4 are located towards the outer diameter of the disk guide plates and are placed at 120° intervals around the guide plates.

Figure 2:
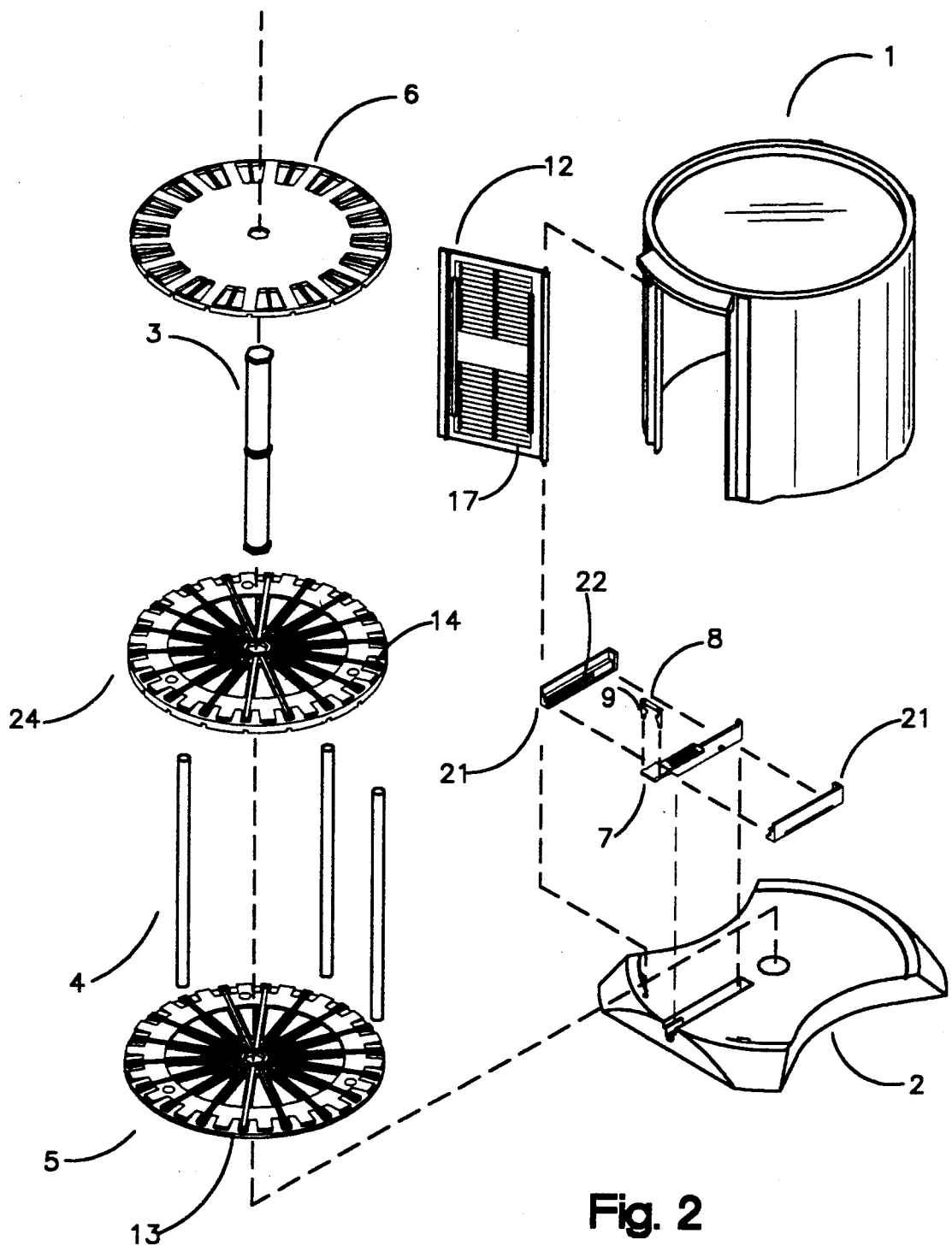
FIG. 2 is an exploded assembly view of the electronic media storage apparatus of FIG. 1 showing interior construction details.

The preferred embodiment shown in FIGS. 1 and 2 shows two levels of floppy disk storage. The internal structure of the electronic media storage apparatus, consisting of the lower, middle and upper guide plates, spacers, and axle, is referred to as the storage unit 20.

The lower guide plate 5 is basically a flat disk. The center of the plate contains a hexagonal hole to accommodate the axle 3. The guide plate has 18 slots 14 in its upper surface. The slots extend from the hexagonal hole to the outer periphery of the plate. The slots are placed evenly around the disk at 20° intervals. The outermost end of the slots has a small lip which holds the floppy disk in the slot when the storage unit 20 is being rotated or otherwise moved.

On both sides of the outermost end of each slot, indexing characters 13 are placed. These characters correspond to the indexing characters used on an index card 17.

Eighteen semispherical apertures 11 are located on the under of the lower guide plate 5. The apertures are placed in a spiral pattern around the axis of rotation of the storage assembly 20. An aperture is located on the centerline of each slot 14. As shown on FIG. 3, the aperture closest to the center of the guide plate is located on the centerline of the slot 14 corresponding to the first index position. The aperture closest to the outer periphery of the guide plate is located on the centerline of the slot 14 corresponding to the last index position.

The upper guide plate 6 is basically a flat disk. The center of the plate contains a hexagonal hole to accommodate the axle 3. The guide has 18 slots 14a in its lower surface. The slots extend from the hexagonal hole to the outer periphery of the plate. The slots are placed evenly around the disk at 20° intervals. The outermost end of these slots does not have a small lip like the slots in the lower guide plate 5. The upper guide plate 6 does not contain any index reference characters.

The middle guide plate 24 is a single plate which is essentially the lower surface of upper guide plate 6 and the upper surface of lower guide plate 5.

The storage assembly 20 rests upon a base 2 and is enclosed by a cover 1. The lower end of the axle 3 is secured to the base 2. The under surface of the lower guide plate 5 adjacent to the base 2 rests upon a friction reducing washer (not shown). The washer reduces friction between the storage assembly 20 and the base 2.

The base 2 is roughly rectangular. The lower guide plate 5 extends beyond the left and right edges of the base. The under surface of the lower guide plate 5 contains finger slots 25 which are pushed by hand whenever it is desired to rotate the storage assembly 20.

The cover 1 is basically a hollow right circular cylinder open at the lower end. It is placed over the storage assembly 20 after the storage assembly has been secured to the base 2. The center inside surface of the top of the cover has a circular hub (not shown) which accepts the upper end of the axle 3 and in conjunction with the base 2 maintains the storage assembly in an upright position.

The cover contains a door 12 which is hinged at two points and pivots about a vertical axis. An index card 17 can be placed on the inside of the door. The index card is numbered or lettered in the same manner as the index lever 7 and the lower and middle guide plates 5, 24 (see index characters 13).

The indexing mechanism for the electronic media storage apparatus primarily consists of an index lever 7, latch projection 16, and latch retaining apertures 11. The index lever is located in the base 2 directly under the lower guide plate 5. The index lever slides horizontally into the base. The innermost end of the index lever 7 projects upward with a semispherical tip, referred to as the latch projection 16. The latch projection is sized slightly smaller than the latch retaining apertures 11.

The outermost half of the index lever 7 contains indexing lettering 13 and latch notches 15. The lettering and the notches are located on both sides of the index lever 7. The index lettering 13 and corresponding notches 15 are placed side by side on the index lever 7. The sequence of lettering and notches on the left side of the index lever 7 is offset from the sequence on the right side. The first index letter and latch notch are located on the right of the index lever 7. The second index letter and latch notch are located on the left side of the index lever 7. The sequence of index positions continues to alternate sides until the last index position is located.

As described above for the latch projection retaining apertures 11 located on the underside of the lower guide plate 5, the first index position corresponds to the index lever 7 fully inserted and the last index position corresponds to the index lever 7 fully withdrawn.

Located on both sides of the index lever 7 are pivots 23. The pivots engage slots 22 in lever inserts 21. When the indexing mechanism is assembled, the pivots 23 on the index lever 7 are inserted into the slots 22 on the lever inserts 21. All three pieces are then inserted as a unit into a cavity in the base 2. Small extensions (not shown) on the sides of the lever inserts 21 engage the sides of the cavity in the base 2 and retain the lever inserts 21 and the index lever 7 in place.

The index lever 7 is latched at the desired index position by a mechanism consisting of a latch arm 8 and two latch levers 9. FIGS. 4 and 5 show the detail of this mechanism. The latch levers 9 pivot about a horizontal axis and are located on either side of the index lever 7 in a recess in the base 2. The latch lever 9 is essentially a rectangular member with rounded ends. The midsection of the latch lever 9 extends towards the index lever 7 to engage one of the notches 15 thus retaining the index lever 7 at the desired position.

The latch arm 8 is a rectangular member which is connected to the tops of both latch levers 9. The latch arm 8 is sized such that when one latch lever 9 is vertical and is latching the index lever 7 in place, the other latch lever 9 is pushed away from the index lever 7.

When the index lever 7 is moved, the vertical latch lever 9 is pushed away from the index lever 7. The latch arm 8 then pulls the other latch lever 9 to the vertical position and the latch lever 9 engages the next notch 15 on the opposite side of the index lever 7.

FIG. 5 shows the position of the latch levers 9 and the latch arm 8 when the index lever 7 is latched at an odd index position.

When accessing the storage unit 20, the door 12 is opened and the index card 17 is consulted to determine the desired index position. The index lever 7 is grasped at its outer end and is lifted vertically to rotate the index lever about the pivots 23 which disengages the latch projection 16 from the latch retaining aperture 11. The index lever 7 is then moved to the desired index position. As the index lever 7 is moved, the latch levers 9 alternately engage the notches 15 on the index lever 7. When the movement is stopped, the index lever 7 will be latched by a latch lever 9. After reaching the desired index position, the index lever is released which allows the lever to return to a horizontal position where the latch projection 16 can engage a latch retaining aperture 11 when the storage assembly is rotated.

The lower disk guide 5 is pushed using the finger slots 25 at either side of the base 2 and the storage unit 20 is rotated clockwise or counterclockwise. When the storage unit 20 has rotated to the desired location, the latch projection 16 on the end of the latch lever 7 will engage the latch retaining aperture 11 for that location, latching the storage unit 20 in place.

The preferred embodiment described above is for storage of 3.5 inch floppy disks. An alternate configuration is used for 5.25 inch floppy disks. The operation of the electronic media storage apparatus for 5.25 floppy disks is as described above.

The differences for 5.25 inch floppy disk are in the configuration of the lower and upper guide plates 5, 6. The is no middle guide plate 24 for the 5.25 inch floppy disk configuration. FIG. 6 shows the lower guide plate for 5.25 inch floppy disks. The upper guide plate 6 for 5.25 inch floppy disks, matches the configuration shown in FIG. 6.

The slots 14 are positioned at an angle of 10° from normal to the axle 33 rather than being normal to the axle. There are 24 slots on the lower guide plate 5 located at 15° intervals. The diameter of the lower guide plate is larger than for the 3.5 floppy disks. The storage assembly 20 has one level of storage locations rather than two.

In another alternate configuration, additional levels of storage are added by providing additional sets of lower, middle, and upper guide plates 5, 24, 6 and spacers 4. The cover 1 is longer in order to cover the additional height.

The configurations described above are for 3.5 inch floppy disks and 5.25 inch floppy disks. By varying the width of the slots 14, 14a, the angle and placement of the slots, the diameter of guide plates 5, 6, 24 and the length of the spacers 4, many other storage devices can be accommodated, such as cassette tapes, video tapes, cartridge tapes, video cartridges, compact laser disks, and the like.

The present invention contains many advantages over the prior art. The primary advantages are the fixed storage locations which maintain any ordering of the floppy disks and the indexer which allows for rapid selection and access of any floppy disk stored in the electronic media storage apparatus.

I claim:

1. An electronic media storage apparatus comprising:
   (a) a housing means having a horizontal base and case, said case having a horizontal top wall and a cylindrical side wall, said side wall having an access opening formed therein; and
   (b) a carousel means comprising:
      (i) a vertical shaft, the lower end of said shaft rotatably secured to said base, the shaft having upper and lower end portions; and
      (ii) a horizontal lower disk fixedly secured to the lower end portion of said shaft, said lower disk having upper and lower surfaces, said lower disk having a plurality of radially extending circumferentially spaced lower disk electronic media receiving slots formed in the upper surface thereof; and
      (iii) a horizontal upper disk fixedly secured to the upper end portion of said shaft in vertically spaced parallel relation to said lower disk, said upper disk having upper and lower surfaces, said upper disk having a plurality of radially extending circumferentially spaced upper disk electronic media receiving slots formed in the lower surface thereof with each of said upper disk electronic media receiving slots corresponding to a lower disk electronic media receiving slot; and
   (c) indexing means for stopping rotary motion of said upper and lower disks at a preselected electronic media receiving slot.

2. The apparatus defined in claim 1 wherein:
   (a) said lower disk having a plurality of apertures formed in the lower surface thereof in helically spaced relation with each of the apertures corresponding to a lower disk electronic media receiving slot; and
   (b) said indexing means having a lever, said lever having an upwardly projecting tip at one end thereof whereby said tip releasably engages one of said apertures thereby stopping said carousel means at the preselected electronic media receiving slot.

3. The apparatus defined in claim 2 further comprising:
   (a) a door moveably mounted on said side wall whereby said door closes over said access opening, said door having inside and outside surfaces; and
   (b) first indicia means on said lower disk for indicating each of said electronic media receiving slots; and
   (c) chart means on the inside surface of said door having a plurality of recording spaces thereupon; and
   (d) second indicia means corresponding to said first indicia means adjacent each of said recording spaces; and
   (e) third indicia means on said lever, said third indicia means corresponding to said first indicia means.

4. The apparatus defined in claim 1 wherein said lower disk electronic media receiving slots having inner and outer ends and having a retaining lip at the outer end thereof.

5. The apparatus defined in claim 1 wherein:
   (a) said lower disk having a plurality of bosses formed in the lower surface thereof in helically spaced relation with each of the bosses corresponding to a lower disk electronic media receiving slot; and
   (b) said indexing means having a lever, the uppermost surface at one end of said lever having an aperture whereby said aperture releasably engages one of said bosses thereby stopping said carousel means at the preselected electronic media receiving slot.

6. The apparatus as defined in claim 1 wherein said upper disk electronic media receiving slots and said lower disk electronic media receiving slots extend from a point near said shaft to a point near the outer periphery of said disk.

7. The housing means defined in claim 1 wherein said side wall having a door moveably mounted on said side wall whereby said door closes over said access opening.

8. The apparatus defined in claim 1 further comprising:
   (a) a door moveably mounted on said side wall whereby said door closes over said access opening; and
   (b) first indicia means on said lower disk for indicating each of said electronic media receiving slots; and
   (c) chart means on the inside surface of said door having a plurality of recording spaces thereupon; and
   (d) second indicia means corresponding to said first indicia means adjacent each of said recording spaces.

9. The apparatus defined in claim 1 wherein said housing means consists of a horizontal base.

10. The apparatus defined in claim 1 wherein said carousel means having at least one horizontal intermediate disk fixedly secured to said shaft between said upper and lower disks, in vertically spaced parallel relationship to said lower disk and said upper disk, each of said intermediate disks having upper and lower surfaces, and each of said intermediate disks having a plurality of radially extending circumferentially spaced intermediate disk electronic media receiving slots formed in the upper and lower surfaces thereof with each of said intermediate disk electronic media receiving slots corresponding to an electronic media receiving slot in the disks located immediately above and below said intermediate disk.

11. The apparatus defined in claim 10 wherein said intermediate disk electronic media receiving slots extend from a point near said shaft to a point near the outer periphery of said disk.

12. The apparatus defined in claim 10 wherein said intermediate disk electronic media receiving slots on the upper surface of said intermediate disk having inner and outer ends and having a retaining lip at the outer end thereof.

13. An electronic media storage apparatus comprising:
  (a) a housing means having a horizontal base and case, said case having a horizontal top wall and a cylindrical side wall, said side wall having an access opening formed therein; and
  (b) a carousel means comprising:
    (i) a vertical shaft, the lower end of said shaft rotatably secured to said base, the shaft having upper and lower end portions; and
    (ii) a horizontal lower disk fixedly secured to the lower end portion of said shaft, said lower disk having upper and lower surfaces, said lower disk having a plurality of radially extending circumferentially spaced lower disk electronic media receiving slots formed in the upper surface thereof in, said lower disk electronic media receiving slots having inner and outer ends and having a retaining lip at the outer end thereof; and
    (iii) a horizontal upper disk fixedly secured to the upper end portion of said shaft in vertically spaced parallel relation to said lower disk, said upper disk having upper and lower surfaces, said upper disk having a plurality of radially extending circumferentially spaced upper disk electronic media receiving slots formed in the lower surface thereof with each of said upper disk electronic media receiving slots corresponding to a lower disk electronic media receiving slot.

14. The apparatus defined in claim 13 wherein said carousel means having at least one horizontal intermediate disk fixedly secured to said shaft between said upper and lower disks, in vertically spaced parallel relationship to said lower disk and said upper disk, said intermediate disks having upper and lower surfaces, said intermediate disks having a plurality of radially extending circumferentially spaced intermediate disk electronic media receiving slots formed in the upper and lower surfaces thereof with each of said intermediate disk electronic receiving media slots corresponding to an electronic media receiving slot in the disks located immediately above and below said intermediate disk, said intermediate disk electronic media receiving slots in the upper surface of said intermediate disk having inner and outer ends and having a retaining lip at the outer end thereof.

* * * * *